INVENTOR
Henry H. Yerk
BY William J. Baumberger
Evans & McCay
ATTORNEYS

May 31, 1932.   H. H. YERK ET AL   1,860,794
AXLE GRINDER
Filed Jan. 25, 1928    7 Sheets-Sheet 7

INVENTOR
Henry H. Yerk
William J. Bamberger
BY
Evans & McCoy
ATTORNEYS

Patented May 31, 1932

1,860,794

UNITED STATES PATENT OFFICE

HENRY H. YERK AND WILLIAM J. BAUMBERGER, OF DAVENPORT, IOWA, ASSIGNORS TO MICRO MACHINE COMPANY, OF BETTENDORF, IOWA, A CORPORATION OF IOWA

AXLE GRINDER

Application filed January 25, 1928. Serial No. 249,229.

This invention relates to a grinding machine for grinding cylindrical bodies, and more particularly to a machine for simultaneously grinding cylindrical surfaces at the opposite ends of a work piece, the invention being herein illustrated as applied to a machine for grinding the opposite ends of a car axle.

An object of the invention is to provide work supporting means by which the work may be quickly adjusted and centered with respect to grinder heads at opposite ends thereof and further to provide means in connection with the grinder heads for adjusting each grinding wheel independently of the other.

Other objects are to provide means for simultaneously controlling the feed of a plurality of grinding wheels, to provide means for simultaneously reciprocating the grinding wheels, to provide means for independently varying the length of stroke of each grinding wheel and to provide means for shifting the grinding wheels manually, independently of the power operated means.

With the above and other objects in view, the invention may be said to comprise the grinding machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Referring to the accompanying drawings, the machine is provided with an elongated supporting frame 1, provided with widened end portions 2 upon which the grinder heads are supported. Between the end portions 2 thereof, the supporting frame 1 carries a pair of work supporting slides 3, which are mounted for adjustment on transversely extending guideways 4 on the frame. The slides 3 are adjustable transversely of the frame along guideways 4 by means of lead screws 5, which have squared ends 5—a projecting from the frame at the front thereof and adapted to receive hand cranks for turning the screws. Each side 3 carries a hollow standard 6 which forms a support for a vertical screw 7, which is held against rotation in the standard by means of a key 8. Each screw 7 is threaded in a nut 9 rotatably mounted within the standard 6 at the base thereof. Each nut has fixed thereto a worm gear 10, which meshes with a worm 11 on a transverse shaft 12 extending to the front of the frame and provided with a squared end 12—a to receive a hand crank. Each of the screws 7 carries a supporting head 13 at its upper end and each supporting head is provided with a V shaped groove 14 to receive a car axle which is clamped to the heads by means of bolts 15 and cross bars 16.

By means of lead screws 5, the axle supported by the screws 7 may be adjusted transversely of the frame and by turning the shafts 12, the axle may be adjusted vertically.

Each of the end portions 2 of the frame is provided with a slideway 17 upon the top thereof which extends longitudinally of the frame and, upon these slideways, there is mounted a movable grinder head 18 which may be adjusted along the slideways 17 toward and from the opposite ends of the work supported upon the central portion of the frame. Each of the heads 18 adjacent its inner end is provided with a horizontally disposed hollow cylindrical casing 19 provided with bearing shoulders 20 and 21 at the inner and outer ends thereof. Within the cylindrical casing 19, there is rotatably mounted, a cylindrical supporting member 22, which is preferably hollow and provided with an outwardly projecting flange 23 at its outer end, which overlies the shoulder 20 on the casing 19 and which has fixed thereto at its inner end, a ring gear 24 which overlies the shoulder 20 at the inner end of the casing 19, the flange 23 and gear 24 serving to hold the cylindrical supporting member against longitudinal movement.

The gear 24 is preferably housed within a cover plate 25 overlying the inner face of the gear and a flange 26 on the housing 19 which closely overlies the periphery of the gear and to which the cover plate 25 is attached. The cylindrical supporting member 22 is provided with an eccentrically disposed horizontal bearing 27 within which is journaled a sleeve 28. The sleeve 28 is provided with an eccentrically disposed longitudinal bore in which is journaled a shaft 29 which projects at both ends beyond the ends of the sleeve 28, the inner end of the shaft carrying a grinding wheel 30 and at the outer end thereof having fixed thereto a pulley 31.

By rotating the cylindrical supporting member 22 within the casing 19 an orbital movement is imparted to the grinding wheel, around the periphery of the cylindrical axle or other piece of work being ground, and by turning sleeve 28 within the bearing 27, the shaft 29 and grinding wheel 30 carried thereby may be adjusted toward and away from the axis of orbital movement, the grinding wheel being fed toward said axis during the grinding operation as the diameter of the work is reduced and away from the axis of orbital movement to free it from the work. For shifting the shaft 29 and grinding wheel toward and away from the axis of the work, the sleeve 28 has fixed thereto at its outer end a worm gear 32 which meshes with a worm 33 fixed to a shaft 34, which is journaled in the rotatable supporting member 22 at its outer end. The shaft 34 is provided with a hand crank 35 by means of which it may be turned manually to properly position the grinding wheel with respect to the work.

Means is also provided for turning the sleeve 28 automatically during the operation of the machine to feed the grinding wheel to the work and this automatic feed movement is imparted to the sleeve 28 through a helical gear 36 fixed to the shaft 34 and meshing with a helical gear 37 fixed to a shaft 38 journaled in the cylinder 22 at right angles to the shaft 34. The shaft 38 has fixed thereto a ratchet 39 which is engaged by a pawl 40 pivoted upon the outer end face of the cylinder 22, the pawl and ratchet serving to hold the shaft 38 against rotation in one direction. The shaft 38 has also mounted thereon a spring actuated ratchet lever 41 which is normally held in a position projecting beyond the periphery of the cylinder 22 and is adapted to engage during the rotation of the cylinder with either one of two pins 42 and 43, mounted in the casing 19 adjacent the periphery of the cylinder 22 and shiftable into and out of positions in the path of the lever 41. The pin 42 is closer to the periphery of the cylinder 22 than the pin 43 and when engaged by the lever 41 turns the lever and shaft 38 through a greater angle than the pin 43. During each revolution of the cylinder 22, the lever 41 engages with the pin 42 or with the pin 43, imparting a turning movement to the shaft 38 through a predetermined angle and this turning movement of the shaft 38 imparts a proportional turning movement to the sleeve 28 through the helical gears 37 and 36 and through the worm 33 and gear 32. Ordinarily, in rough grinding, the pin 42 will be advanced to engaging position and the pin 43 will be retracted and during the finishing operation, the pin 42 will be retracted and the pin 43 advanced into the path of the lever 41.

For actuating the pins 42 and 43, the pins are provided within the casing 19 with racks 44 and 45, which mesh with a pinion 46 on opposite sides of the pinion. The pinion 46 is fixed to a shaft 47, which extends to the exterior of the casing at the front, thereof, and which carries a gear segment 48 which meshes with a gear segment 49 journaled in the casing beneath the segment 48. The segment 49 has connected thereto a link 50 which is pivoted at its upper end of the segment and at its lower end to a bell crank lever 51, pivoted to the lower portion of the grinder head. The lever 51 is provided with a pin 52 which engages in a slot 53 in a horizontally disposed bar 54. The bars 54 have parallel link supports, the outer end of each bar being supported upon the upper end of a link 55, pivoted at its lower end to the frame 1 and at their inner ends upon arms of bell crank levers 56 and 57, also pivoted to the frame. The bell crank levers 56 and 57 are connected by links 58 and 59 to actuating levers 60, which are pivoted on the frame, one adjacent each end of the work supporting portion thereof, the lever 60 being connected by a link 61 for simultaneous movement so that an operator standing at either end of the machine may, by operating the adjacent lever 60, actuate simultaneously the trip pins 42 and 43 on both grinder heads, movement of a lever 60 in one direction advancing the pin 42 and retracting the pin 43 and in the opposite direction advancing the pins 43 and retracting the pins 42.

It is desirable that means be provided for regulating the feed of one grinding wheel independently of the other and, to this end, means is provided for actuating each of the shafts 47 independently of the other. Each shaft 47 is slidably mounted for endwise movement and is provided with a set screw 62 which engages in a notch 63 in the segment 48 thereon to key the segment to the shaft. By pushing the shaft 47 inwardly, the shaft is freed from the segment 48 and may be turned without actuating the segment by means of a knob 64 attached to the outer end of the shaft. Each of the grinder supporting heads 18 is provided at the outer end thereof with a housing 65 forming a support for an electric motor 66, which has its shaft 67 coaxial with the axis of the cylindrical supporting member 22, and this shaft has fixed thereto a pulley 68 through which the grinding wheel shaft 29 is driven. Journaled on each of the cylindrical supporting members 22 adjacent the periphery thereof is an idler pulley 69 and upon the opposite side of the pulley 68 there is mounted a tightener pulley 70 which is carried by an arm 71 of a bell crank lever which is pivoted at 72 to the cylinder 22 and this tightener is actuated toward the periphery of the cylindrical supporting member 22 by means of a coil spring 73 which is attached at one end to the other arm 74 of the bell crank lever and at its opposite end to a pin 75 on the member 22, the inward movement of the tightener pulley 70 being limited by a lug 76 on the member 22 in the path of movement of the arm 74. A drive belt 77 extends over the pulleys 31, 68, 69 and 70 and is kept taut by the tightener pulley 70. The belt 77 provides the driving connection between the pulley 68 on the motor shaft and the pulley 31 on the grinding wheel shaft and the coaxial position of the pulley 68 with respect to the cylindrical supporting member 22 permits the grinding wheel to be driven while the cylindrical member is rotating and imparting orbital movement to the grinding wheel.

To the outer side of the pulley 68, each motor shaft has fixed thereto a small pulley 78 which drives a belt 79 extending over the pulley 78 and over a larger pulley 80 carried by a shaft 81 parallel with a motor shaft and journaled in the housing 65 beneath the motor. The shaft 81 carries a bevel gear 82 within the housing 65 which meshes with a bevel gear 83 on a transverse shaft 84 within the housing 65. The shaft 84 drives mechanism through which rotation is imparted to the cylindrical supporting member 22 and through which reciprocating motion is imparted to the grinder supporting head.

The gear 83 is mounted on a clutch element 85 which is rotatable on the shaft 84 and, cooperating with the clutch element 85, there is a shiftable clutch element 86 which is keyed to the shaft 84 and slides on the shaft into and out of engagement with the clutch element 85. The shiftable clutch element 86 is provided with a peripheral groove 87 which receives the fork 88 of a clutch shifter rod 89 extending parallel of the shaft 84 and slidably mounted in the housing 65. The rod 89 extends through the front wall of the housing and is connected to an actuating lever 90 by means of which the clutch element 86 may be moved into and out of engaging position. The shaft 84 carries a worm 91 which meshes with a worm gear 92 on a shaft 93 which extends full length of the supporting head adjacent the bottom thereof, and is provided at its inner end with a pinion 93—a which meshes with the gear 24 attached to the inner end of the cylindrical supporting member 22, to rotate the member 22, and impart the orbital movement to the grinding wheel 30. Adjacent its outer end, the shaft 93 carries a worm 94 which meshes with a horizontally disposed worm gear 95 which carries a grooved cam 96 through which reciprocating motion is imparted to the supporting head. A pin 97 carried by the forward end of a lever 98 engages in the groove of the cam 96 and this lever is pivotally connected intermediate its ends by a pin 99 with a rack bar 100, which is supported in the frame beneath the head and extends longitudinally of the head. The rack bar 100 is engaged by a pinion 101 on a transverse shaft 102 to which is fixed an internal gear 103 which meshes with a pinion 104 on a short shaft 105 journalled in the front wall of a frame and projecting through the wall. The shaft 105 is provided with a crank 106 by which it may be turned to rotate the shaft 102 to adjust the rack bar. The lever 98 is provided with a longitudinal slot 107 in which is slidably mounted a block 108 through which a vertical pivot pin 109 extends, the pin being carried by a bar 110 mounted for angular adjustment on the bottom of the head 18. The inner end of the bar 110 is connected by means of a vertical pivot 111 to the supporting head 18 and is adjustably secured at its outer end by means of bolt 112 extending through an arcuate slot 113 in the outer end of the head. The rack bar 100 is mounted in a channel guideway 114 extending longitudinally of the frame and may be clamped against longitudinal movement by means of a clamp bar 115 extending transversely of the frame and provided with a hook 116 at one end for engagement with the rack bar and provided with a nut 117 at its opposite end to draw the hook into clamping engagement with the bar.

When the rack bar 100 is clamped against longitudinal movement, the pin 99 becomes the fulcrum of the lever 98 and the swinging movement of the lever 98 during the rotation of the cam 96, acting through the pivot pin 109, imparts a reciprocating movement to the head 18 upon each revolution of the cam 96, the cam 96 being preferably so formed as to provide a dwell at each end of the stroke of the head.

Means is provided for actuating the shaft 84 to impart the orbital movement of the grinding wheel and the reciprocating movement to the head manually when the shaft 84 is disconnected from the motor. In order to provide for the manual operation, the shaft 84 is journaled at its forward end in a clutch casing 118 and within the casing the shaft 84 has fixed thereto a clutch element 119 which is adapted to be engaged by a complemental clutch element 120 carried by a shaft 121 in axial alinement with the shaft 84 and projecting through the forward end of the casing 118. The shaft 121 is provided with a pair of peripheral grooves 122, either of which is adapted to be engaged by a ball detent 123, the two grooves being so positioned that when the detent is in engagement with one of the grooves, the clutch member 120 is held in engagement with the clutch member 119 and when the detent is in engagement with the other groove, the clutch member 120 is held out of engagement member 119. The projecting portion of the shaft 121 passes through the clutch actuating lever 90 and carries a collar 124, which projects into the path of movement of the lever 90 so that when the lever 90 is actuated to engage the clutch members 85 and 86, the shaft 121 is pulled outwardly to release the clutch member 119 from the clutch member 120, so that, while the shaft 84 is being driven from the motor 66, the shaft 121 is disconnected. The outer end of the shaft 121 is squared to receive a hand crank 125 by means of which it may be turned to operate the mechanism for imparting orbital movement to the grinding wheel and the reciprocating movement to the grinder supporting head.

Figure 1:
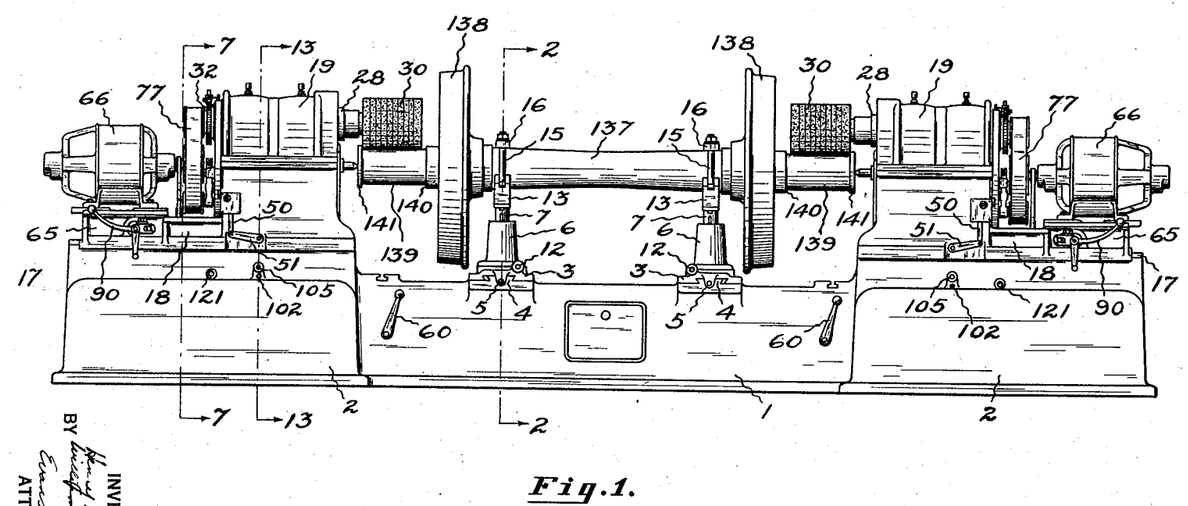
Fig. 1 is a front elevation of the machine.
Figure 2:
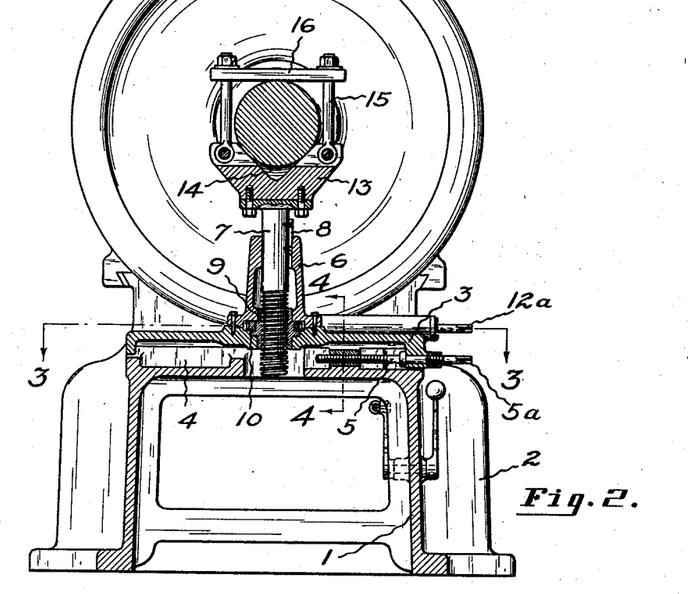
Fig. 2 is a section taken on the line indicated at 2—2 in Fig. 1.
Figures 3, 4:
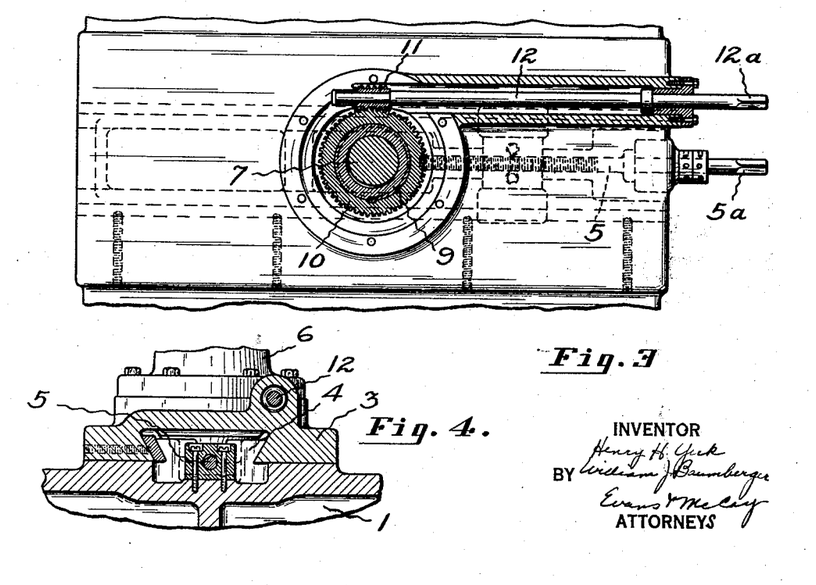
Fig. 3 is a section on the line indicated at 3—3 in Fig. 2.
Fig. 4 is a section taken on the line indicated at 4—4 in Fig. 2.
Figure 5:
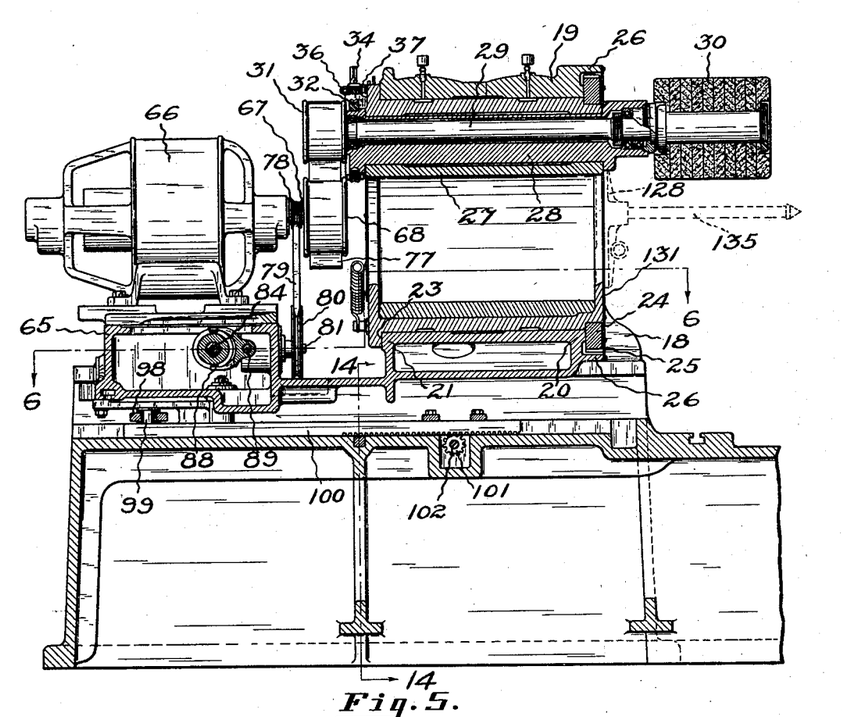
Fig. 5 is a longitudinal vertical section taken centrally through the grinding head at one end of the machine.
Figure 6:
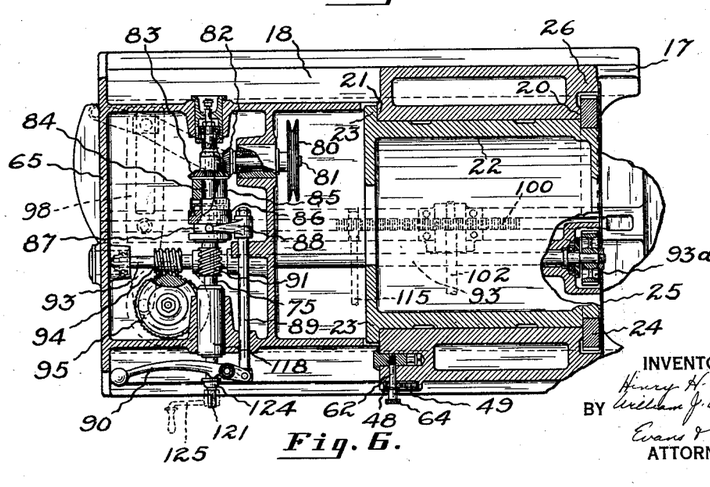
Fig. 6 is a section taken on the line indicated at 6—6 in Fig. 5.
Figure 7:
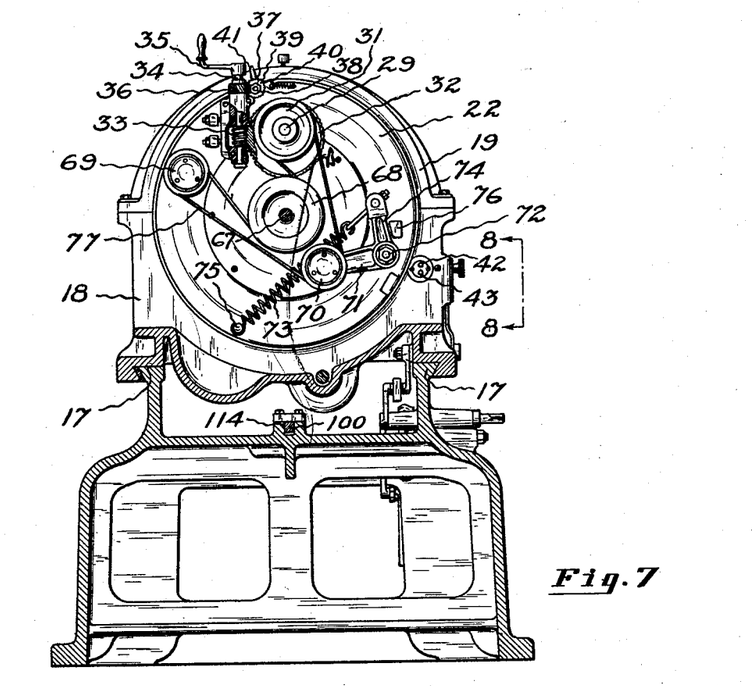
Fig. 7 is a section taken on the line indicated at 7—7 in Fig. 1.
Figure 8:
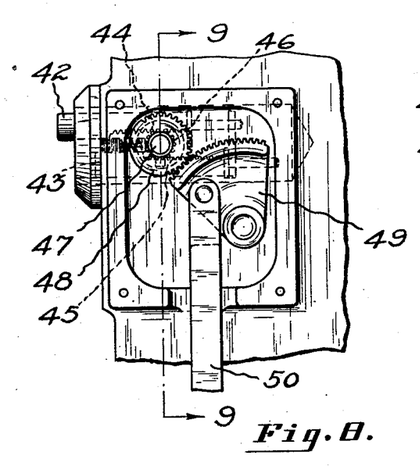
Fig. 8 is a plan view of the trip pin actuating mechanism on the grinder head viewed as indicated by line 8—8 in Fig. 7.
Figure 9:
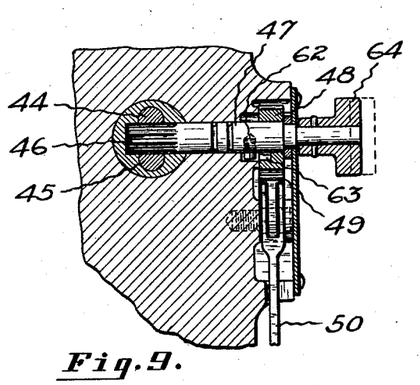
Fig. 9 is a section taken on the line indicated at 9—9 in Fig. 8.
Figures 10, 12:
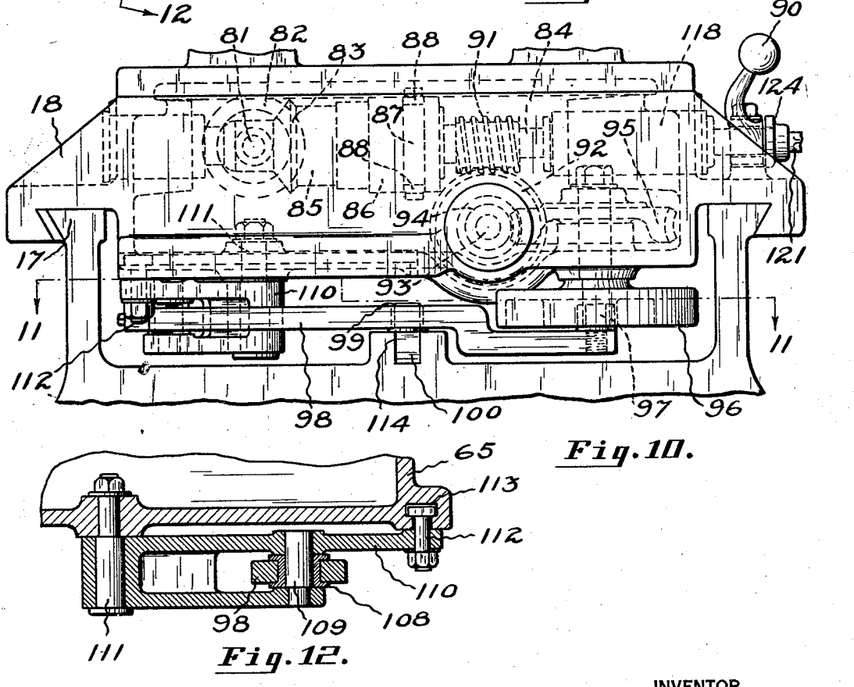
Fig. 10 is an end elevation of the lower portion of one of the grinder heads.
Fig. 12 is a section taken on the line indicated at 12—12 in Fig. 11.
Figure 11:
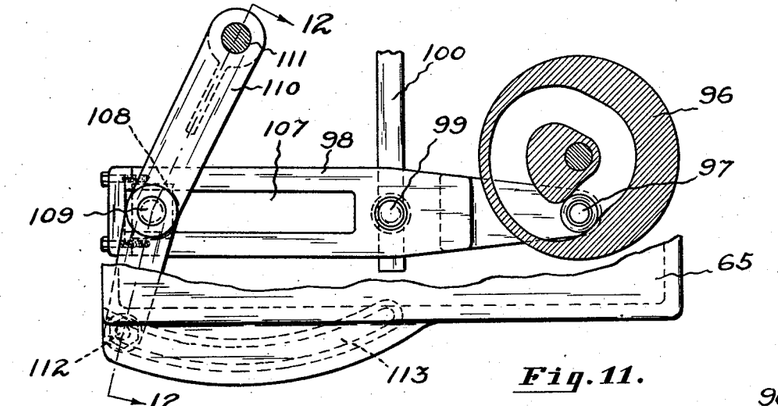
Fig. 11 is a section taken on the line indicated at 11—11 in Fig. 10.
Figures 13, 14, 15, 16, 17:
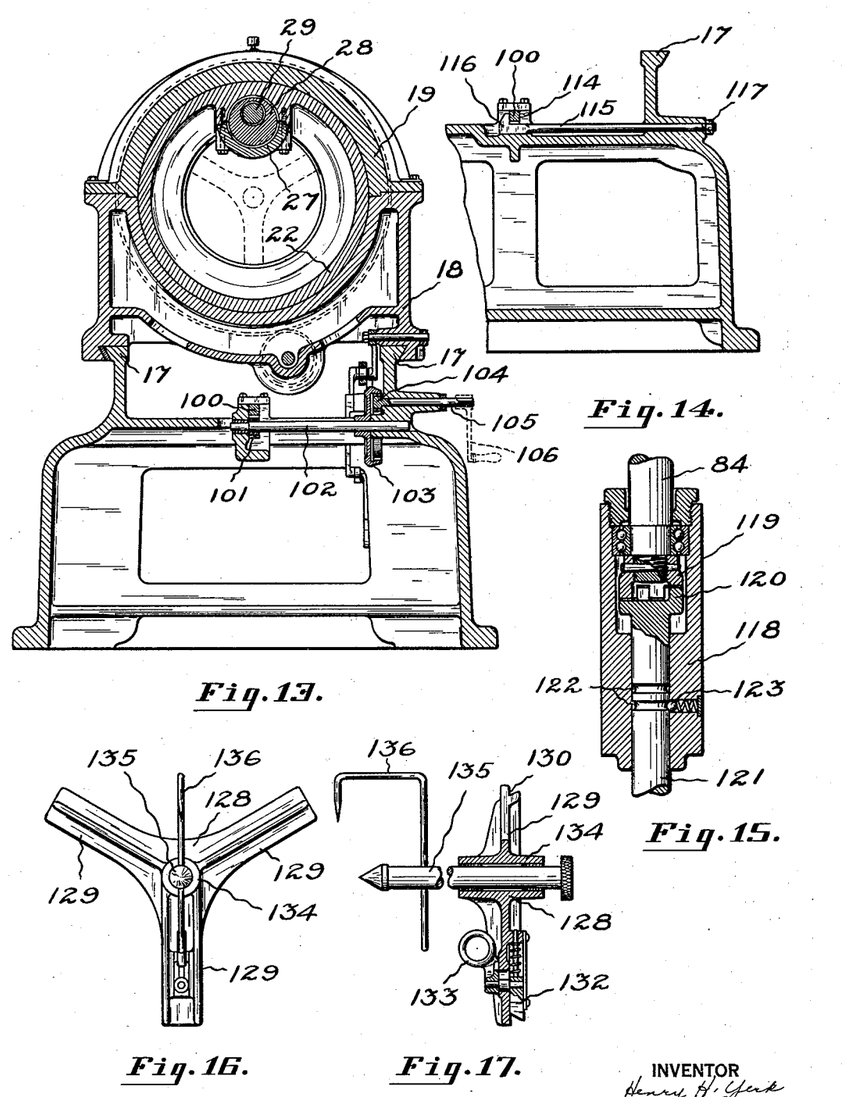
Fig. 13 is a section taken on the line indicated at 13—13 in Fig. 1.
Fig. 14 is a section taken on the line indicated at 14—14 in Fig. 5.
Fig. 15 is a sectional view showing the clutch through which the head stock operating mechanism may be connected for manual operation.
Fig. 16 is a plan view of the work centering device.
Fig. 17 is a transverse section through the center device shown in Fig. 16.
Figure 18:
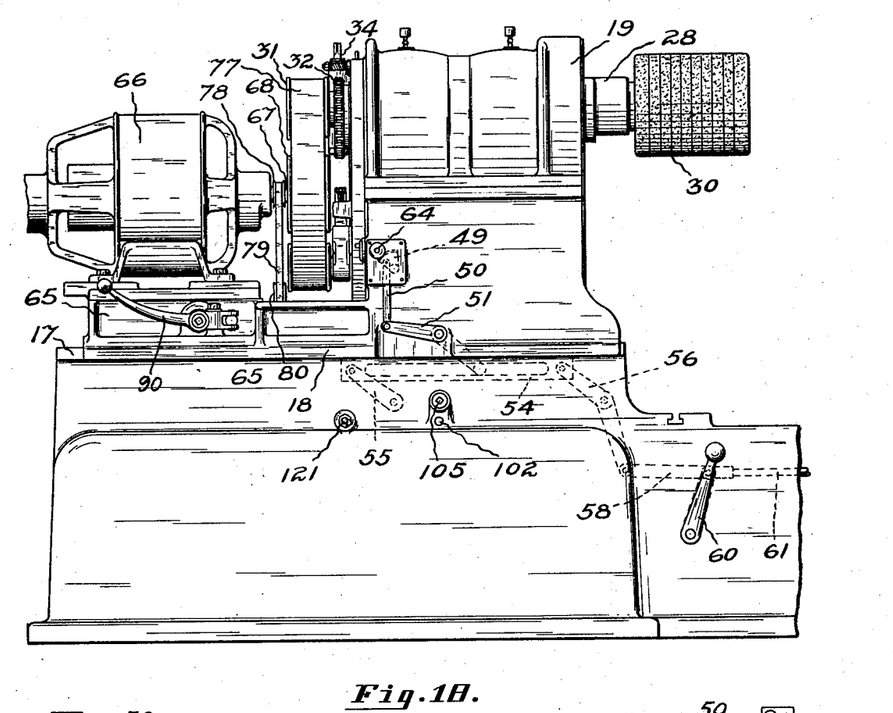
Fig. 18 is a side elevation of one end of the machine showing the link connections through which the feed of the grinding wheel is controlled.
Figure 19:
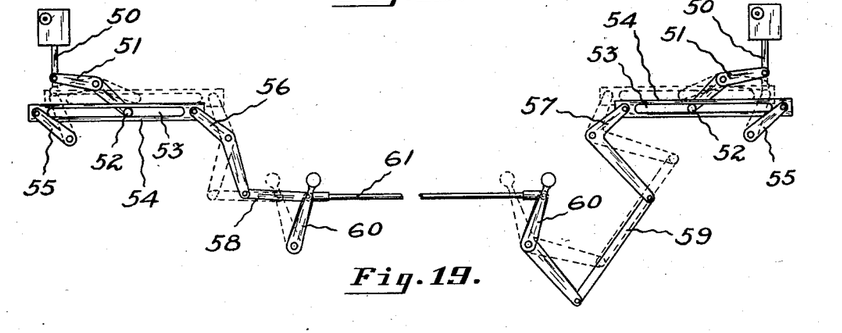
Fig. 19 is a view showing the linkage through which the feeds of the grinding wheels of the two heads are simultaneously controlled.

To properly center the work with respect to the orbital path of the grinding wheel, a centering device such as shown in Figs. 5, 16 and 17 may be provided. The centering device is in the form of a spider 128 having radially extending legs 129 provided with notches 130 at their outer ends for engagement with an inturned flange 131 at the inner end of the cylinder 22. One of the legs 129 is provided with a spring pressed latch 132 for releasably engaging the flange 131 to hold the spider on the cylinder and this latch is provided with a handle 133 by means of which it may be retracted to release the spider from the flange. The spider 128 has a central hub 134 in which is journaled a centering pin 135 which carries an adjustable scriber 136 which has a point engageable with the periphery of work and is movable circumferentially over the peripheral surface of the work when the pin 125 is turned. By adjusting the work supporting slide 3 laterally and the supporting screws 7 vertically, the work may be positioned with respect to the centering device with the axis of the work coinciding with the axis of the centering pin 135.

In the operation of the machine, a car axle 137 having wheels 138 thereon and end bearing portions 139 projecting beyond the wheels, may be placed in the notches 14 of the supporting heads 13 and adjusted as above described until its axis coincides with the axis of the two aligned cylinders 22. The bar 110 and rack 100 are adjusted and secured in the proper positions to cause the grinding wheel 30 to reciprocate between the shoulders 140 and 141 at the inner and outer ends of the bearing portion of the axle to be ground. The motor 66 is then started to drive the grinding wheel and the wheel is adjusted into engagement with the work by turning the sleeve 28 by means of the crank 35. The wheel may then be moved orbitally by means of the hand crank 125 to determine whether or not the setting of the work and the adjustment of the head reciprocating mechanism is correct. When proper orbital and reciprocating movement with respect to the work is obtained, clutch member 86 is shifted into engagement with clutch member 85 by means of the lever 90 to connect the head reciprocating and cylinder rotating mechanism to the motor. Trip pins 42 are then advanced into the paths of the levers 41 on the two drums to impart a feed movement to the grinding wheel upon each revolution of the drum and during the grinding operation, the rate of feed may be changed at any time by turning either of the levers 60 to shift either of the trip pins 42 or 43 into operative position.

What we claim is:

1. In a grinding machine, an elongated supporting frame having work supporting means intermediate the ends thereof, heads at opposite ends of the frame mounted for movement toward and from the work support, a grinding wheel carried by each head, independent means carried by each head for driving the grinding wheel thereon and for simultaneously imparting orbital and radial feed movements to the grinding wheel, and means for simultaneously controlling the feeding means on the two heads.

2. In a grinding machine, an elongated supporting frame having work supporting means intermediate the ends thereof, heads at opposite ends of the frame mounted for movement toward and from the work support, rotatable supporting members on said heads, a grinding wheel journaled eccentrically on each supporting member, separate means on said heads for rotating said supporting members for imparting orbital and radial feed movements to said grinding wheels, means for driving the grinding wheels during their orbital movements, and means for simultaneously controlling the feeding means of the two heads.

3. In a grinding machine, an elongated supporting frame having work supporting means intermediate the ends thereof, heads at opposite ends of the frame mounted for movement toward and from the work support, coaxial rotatable supporting members on said heads, a grinding wheel journaled eccentrically on each supporting member, separate means on said heads for rotating said supporting members and for imparting orbital and radial feed movements to said grinding wheels, means for driving the grinding wheels during their orbital movements, means for automatically reciprocating said heads, and means for simultaneously controlling the feeding means of the two heads.

4. In a grinding machine, an elongated supporting frame having adjustable work supporting means intermediate the ends thereof and alined guideways on opposite sides of the work supporting means, heads at opposite ends of the frame mounted on said guideways for movement toward and from the work support, coaxial rotatable supporting members on said heads, a grinding wheel journaled eccentrically on each supporting member, means carried by the heads for rotating said supporting members to impart orbital movements to said grinding wheels, means carried by the heads for driving the grinding wheels during their orbital movements, means for radial imparting feed movements to the grinding wheels during the orbital movements thereof, and means for simultaneously controlling the feeding means of the two heads.

5. In a grinding machine, an elongated supporting frame having adjustable work supporting means intermediate the ends thereof, heads at opposite ends of the frame mounted for movement toward and from the work support, coaxial rotatable supporting members on said heads, a grinding wheel journaled eccentrically on each supporting member, separate means for rotating the supporting member of each head to impart orbital movements to said grinding wheels, means for driving the grinding wheels during their orbital movements, means for imparting radial feed movements to the grinding wheels during the orbital movements thereof, and means for simultaneously controlling the feeding means on the two heads.

6. In a grinding machine, an elongated supporting frame having work supporting means intermediate the ends thereof, heads at opposite ends of the frame mounted for movement toward and from the work support, rotatable supporting members on said heads, a grinding wheel journaled eccentrically on each supporting member, means for rotating said supporting members to impart orbital movements to said grinding wheels, means for driving the grinding wheels during their orbital movements, means for automatically reciprocating said heads during the orbital movements of said grinding wheels in a direction parallel with the axis of orbital movement, means for varying the length of the stroke of each head, means for imparting radial feed movements to the grinding wheels during the orbital movements thereof, and means for simultaneously controlling the feeding means on the two heads.

7. In a grinding machine, a supporting frame having a guideway thereon, a head mounted for movement along the guideway, a rotatable supporting member journaled in the head, a grinding wheel spindle eccentrically mounted in said rotatable supporting member, means carried by the head for driving the grinding wheel spindle and for rotating said supporting member, means for adjusting said head on said guideway, means for reciprocating said head on the guideway with a predetermined length of stroke in any adjusted position of the head, and means for varying the length of the stroke of the head.

8. In a grinding machine, a supporting frame having a guideway thereon, a head mounted for movement along the guideway, a rotatable supporting member journaled in the head, a grinding wheel spindle eccentrically mounted in said rotatable supporting member, means for driving the grinding wheel spindle and for rotating said supporting member, means for adjusting said head on said guideway, a lever pivoted to the head and adjustably connected to said frame for reciprocating said head on the guideway, means for adjusting the fulcrum of said lever to vary the length of stroke, and means carried by said head for oscillating said lever.

9. In a grinding machine, a supporting frame having a guideway thereon, a head mounted for movement along the guideway, a rotatable supporting member journaled in the head, a grinding wheel spindle eccentrically mounted in said rotatable supporting member, means for driving the grinding wheel spindle and for rotating said supporting member, means for adjusting said head on said guideway, a lever pivotally connected to said frame and to said head, a cam on said head for oscillating said lever, means for shifting the pivotal connection between the lever and frame to adjust said head on the guideway, and means for adjusting the pivotal connection between the lever and head to vary the length of the stroke of the head.

10. In a grinding machine, an elongated frame having longitudinal guideways at opposite ends thereof, a head slidable on each guideway, axially alined rotatable supporting members mounted on said heads, a grinding wheel eccentrically journaled in each supporting member, means for rotating said supporting members, means for driving said grinding wheels during the rotation of said supporting members, a slide mounted for transverse movement on the frame between said heads, and a vertically adjustable work supporting member carried by said slide.

11. In a grinding machine, an elongated frame having longitudinal guideways at opposite ends thereof, a head slidable on each guideway, axially alined rotatable supporting members mounted on said heads, a grinding wheel eccentrically journaled in each supporting member, means for rotating said supporting members, means for driving said grinding wheels during the rotation of said supporting members, an adjustable work support between said heads, means on each of said heads for automatically feeding the grinding wheel toward the axis of the supporting member during the rotation of said supporting member, and means for simultaneously controlling the feeding means on the two heads.

12. In a grinding machine, an elongated supporting frame having adjustable work supporting means intermediate the ends thereof, heads at opposite ends of the frame mounted for movement toward and from the work support, coaxial rotatable supporting members on said heads, a grinding wheel journaled eccentrically on each supporting member, separate means for rotating the supporting member of each head to impart orbital movements to said grinding wheels, means for driving the grinding wheels during their orbital movements, means for reciprocating said heads toward and away from said work support, means for independently varying the length of stroke of the two heads, means on each head for automatically feeding the grinding wheel toward the axis of the supporting member, and means for simultaneously controlling the feeding means on the two heads.

13. In a grinding machine, an elongated supporting frame having adjustable work supporting means intermediate the ends thereof, heads at opposite ends of the frame mounted for movement toward and from the work support, coaxial rotatable supporting members on said heads, a grinding wheel journaled eccentrically on each supporting member, separate means for rotating the supporting member of each head to impart orbital movements to said grinding wheels, means for driving the grinding wheels during their orbital movements, means for imparting radial feed movements to the grinding wheels during the orbital movements thereof, means for simultaneously controlling the feeding means on the two heads, and means for independently varying the rate of feed of the grinding wheels.

14. In a grinding machine, a supporting frame having work supporting means thereon, a head mounted on the frame for movement toward and from the work support, a drive shaft carried by said head, and means operated by said drive shaft for driving said grinding wheel and for simultaneously imparting orbital and radial feed movements to the grinding wheel.

15. In a grinding machine, a supporting frame having a guideway thereon, a head mounted for movement along the guideway, a rotatable supporting member on the head, a grinding wheel carried by the rotatable supporting member eccentrically thereof, a motor mounted on said head, means operated by said motor for driving the grinding wheel and for rotating said supporting member, means for adjusting said head on said guideway, means operated by said motor for reciprocating said head on the guideway with a predetermined stroke in any adjusted position of the head, and means for varying the length of stroke of the head.

In testimony whereof we affix our signatures.

HENRY H. YERK.
WILLIAM J. BAUMBERGER.